(12) United States Patent
Xu et al.

(10) Patent No.: US 12,120,636 B2
(45) Date of Patent: Oct. 15, 2024

(54) WIRELESS COMMUNICATION METHOD, NETWORK DEVICE, AND TERMINAL DEVICE

(71) Applicant: GUANGDONG OPPO MOBILE TELECOMMUNICATIONS CORP., LTD., Dongguan (CN)

(72) Inventors: Yang Xu, Dongguan (CN); Jianhua Liu, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 140 days.

(21) Appl. No.: 17/519,995

(22) Filed: Nov. 5, 2021

(65) Prior Publication Data
US 2022/0061023 A1  Feb. 24, 2022

Related U.S. Application Data

(63) Continuation of application No. PCT/CN2019/086290, filed on May 9, 2019.

(51) Int. Cl.
*H04W 68/02* (2009.01)
*H04W 60/00* (2009.01)
H04W 88/06 (2009.01)

(52) U.S. Cl.
CPC ........... *H04W 68/02* (2013.01); *H04W 60/00* (2013.01); *H04W 88/06* (2013.01)

(58) Field of Classification Search
CPC .............................. H04W 60/00; H04W 68/02
(Continued)

(56) References Cited

U.S. PATENT DOCUMENTS

2013/0165182 A1* 6/2013 Christensen .......... H04W 48/18
455/558
2015/0017982 A1  1/2015 Klatt
(Continued)

FOREIGN PATENT DOCUMENTS

CN  102118700 A  7/2011
CN  104137633 A  11/2014
(Continued)

OTHER PUBLICATIONS

International Search Report and Written Opinion date Jan. 22, 2020 in International Application No. PCT/CN2019/086290. English translation attached.
(Continued)

*Primary Examiner* — Joel Ajayi
(74) *Attorney, Agent, or Firm* — Sheppard, Mullin, Richter & Hampton LLP

(57) ABSTRACT

An embodiment of the present disclosure discloses a wireless communication method and a device, which are capable of updating a parameter that has been transmitted by a network device. The method includes: transmitting, by a terminal device, a first message to the network device, wherein the first message is used to request an update of a first parameter that has been transmitted by a network side to the terminal device, and the first parameter is used to calculate a time parameter for the terminal device to monitor a paging message, wherein the paging message corresponds to a first USIM card of at least two USIM cards in the terminal device; receiving, by the terminal device, a second message, which is transmitted by the network device based on the first message; and updating, by the terminal device, the first parameter based on the second message.

7 Claims, 5 Drawing Sheets

(58) Field of Classification Search
USPC .......................................................... 455/458
See application file for complete search history.

(56) References Cited

U.S. PATENT DOCUMENTS

| | | |
|---|---|---|
| 2017/0230932 A1 | 8/2017 | Challa et al. |
| 2017/0280473 A1 | 9/2017 | Krishnamoorthy et al. |
| 2019/0124572 A1 | 4/2019 | Park et al. |
| 2020/0187155 A1* | 6/2020 | Sha ..................... H04W 68/005 |

FOREIGN PATENT DOCUMENTS

| | | |
|---|---|---|
| CN | 108377581 A | 8/2018 |
| CN | 109155909 A | 1/2019 |
| WO | 2014053044 A1 | 4/2014 |
| WO | 2018161244 A1 | 9/2018 |

OTHER PUBLICATIONS

"3rd Generation Partnership Project, Technical Specification Group Services and System Aspects", General Packet Radio Service (GPRS) enhancements for Evolved Universal Terrestrial Radio Access Network (E-UTRAN) access (Release 15), Dec. 2018.
Extended European Search Report dated Aug. 8, 2022 received in Indian Patent Application No. EP19927711.2.
Communication pursuant to Article 94(3) EPC for European application 1992711.2 mailed Feb. 6, 2023.
Japanese First Office Action with English Translation for JP Application 2021-566336 mailed Jan. 31, 2023.
First Office Action from corresponding Chinese Application No. 202210010993.5, dated Apr. 5, 2023 . English translation attached.
First Examination Report dated Apr. 26, 2022 received in Indian Patent Application No. IN 202127056750.
The Grant Notice from corresponding Chinese Application No. 202210010993.5, dated Jun. 2, 2023. English translation attached.
Communication pursuant to Article 94(3) EPC for European Application 19927711.2 mailed Jun. 30, 2023.
Japanese Grant Notice for Japanese Application 2021-566336 mailed May 9, 2023. English translation attached.
Summons to attend oral proceedings pursuant to Rule 115(1) EPC for European application 19927711.2 mailed Dec. 1, 2023.

* cited by examiner

WIRELESS COMMUNICATION METHOD, NETWORK DEVICE, AND TERMINAL DEVICE

CROSS-REFERENCE TO RELATED APPLICATION

The present application is a continuation of International Application No. PCT/CN2019/086290, filed on May 9, 2019, the entire contents of which are incorporated herein by reference.

TECHNICAL FIELD

An embodiment of the present disclosure relates to the field of communication technologies, and more particularly, to a wireless communication method, a network device, and a terminal device.

BACKGROUND

In a communication system, a network device can configure a terminal device with parameters for communication. However, it is possible that the parameters configured by the network device cannot meet a current communication requirement, thereby leading to an occurrence of low communication performance.

SUMMARY

An embodiment of the present disclosure provides a wireless communication method and a device, which are capable of updating a parameter that has been transmitted by a network device.

In a first aspect, a wireless communication method applied in a terminal device is provided. The method includes transmitting, by the terminal device, a first message to a network device. The first message is used to request an update of a first parameter that has been transmitted by a network side to the terminal device. The first parameter is used to calculate a time parameter for the terminal device to monitor a paging message, the paging message corresponding to a first Universal Subscriber Identity Module (USIM) card of at least two USIM cards in the terminal device. The method further includes: receiving, by the terminal device, a second message, which is transmitted by the network device based on the first message; and updating, by the terminal device, the first parameter based on the second message.

In a second aspect, a wireless communication method applied in a network device is provided. The method includes receiving, by the network device, a first message transmitted by a terminal device. The first message is used to request an update of a first parameter that has been transmitted by a network side to the terminal device. The first parameter is used to calculate a time parameter for the terminal device to monitor a paging message, the paging message corresponding to a first Universal Subscriber Identity Module (USIM) card of at least two USIM cards in the terminal device. The method further includes transmitting, by the network device, a second message to the terminal device based on the first message. The second message is used to instruct the update of the first parameter.

In a third aspect, a terminal device is provided. The terminal device includes a processor and a memory. The memory is configured to store a computer program. The processor is configured to invoke and run the computer program stored in the memory to perform the method according to the first aspect.

In a fourth aspect, a network device is provided. The network device includes a processor and a memory. The memory is configured to store a computer program. The processor is configured to invoke and run the computer program stored in the memory to perform the method according to the second aspect.

DESCRIPTION OF EMBODIMENTS

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5th-Generation (5G) system, etc.

Figure 1:
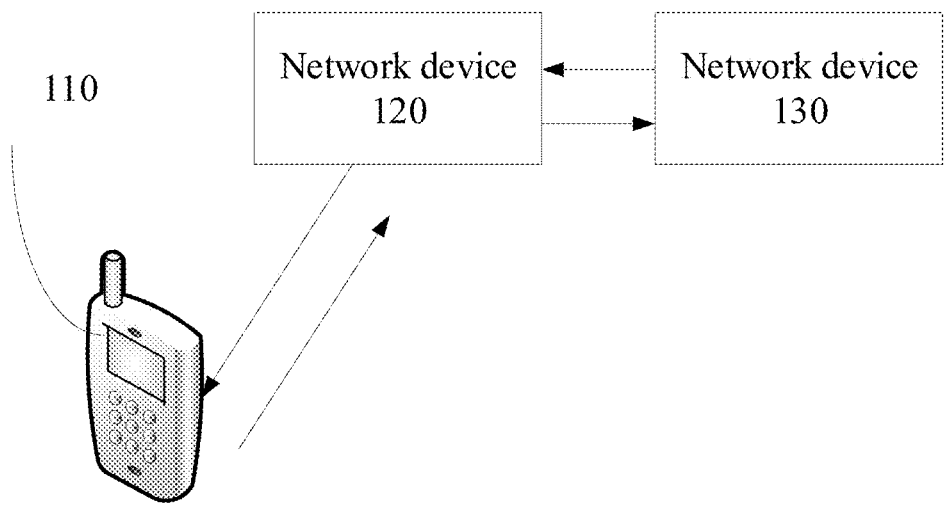
FIG. 1 is a schematic diagram showing a communication system architecture according to an embodiment of the present disclosure.

By way of example, a communication system 100 to which an embodiment of the present disclosure is applied is as illustrated in FIG. 1. The communication system 100 may include a terminal device 110, a network device 120, and a network device 130.

The "terminal device" used herein includes, but is not limited to, a device configured to connect via a wired line connection, such as a Public Switched Telephone Network (PSTN), a Digital Subscriber Line (DSL), a digital cable, a direct cable connection, and/or another data connection/network; and/or via a wireless interface of, for example, a cellular network, a Wireless Local Area Network (WLAN), a digital television network such as a Digital Video Broadcasting Handheld (DVB-H), a satellite network, and an Amplitude Modulation-Frequency Modulation (AM-FM) broadcast transmitter; and/or an apparatus, of another terminal device, configured to receive/transmit a communication signal; and/or an Internet of Things (IoT) device. A terminal device configured to communicate through the wireless interface may be referred to as a "wireless communication terminal", a "wireless terminal", or a "mobile terminal". Examples of the mobile terminal include but are not limited to, a satellite or cellular phone; a Personal Communication System (PCS) terminal that may combine a cellular radiotelephone with capabilities such as data processing, facsimile and data communication; a Personal Digital Assistant (PDA) that may include a radiotelephone, a pager, an Internet/intranet access, a Web browser, a notepad, a calendar, and/or a Global Positioning System (GPS) receiver; and a conventional laptop and/or palmtop receiver, or other electronic devices including a radiotelephone transceiver. The terminal device can refer to an access terminal, a User Equipment (UE), a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network, or a terminal device in the future evolved Public Land Mobile Network (PLMN), etc.

The network device 120 may be a device that communicates with a terminal device 110 (or called a communication terminal or a terminal). The network device 120 may provide communication coverage for a specific geographic region, and may communicate with a terminal device located in the coverage region. In at least one embodiment, the network device 120 may be a Base Transceiver Station (BTS) in a GSM system or a CDMA system, a NodeB (NB) in a WCDMA system, an Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The network device 130 may be a device on a core network side, for example, a Mobility Management Entity (MME), an Access and Mobility Management Function (AMF), a network controller and other network entities, which is not specifically limited in this embodiment of the present disclosure.

It should be understood that terms "system" and "network" in the present disclosure are often used interchangeably herein. The term "and/or" in the present disclosure is only an association relationship describing associated objects, and means that there can be three kinds of relationships. For example, A and/or B can mean three situations: A exists alone, A and B exist at the same time, and B exists alone. In addition, the character "/" in the present disclosure generally represents that associated objects before and after the character "/" are in an "or" relationship.

Figure 2:
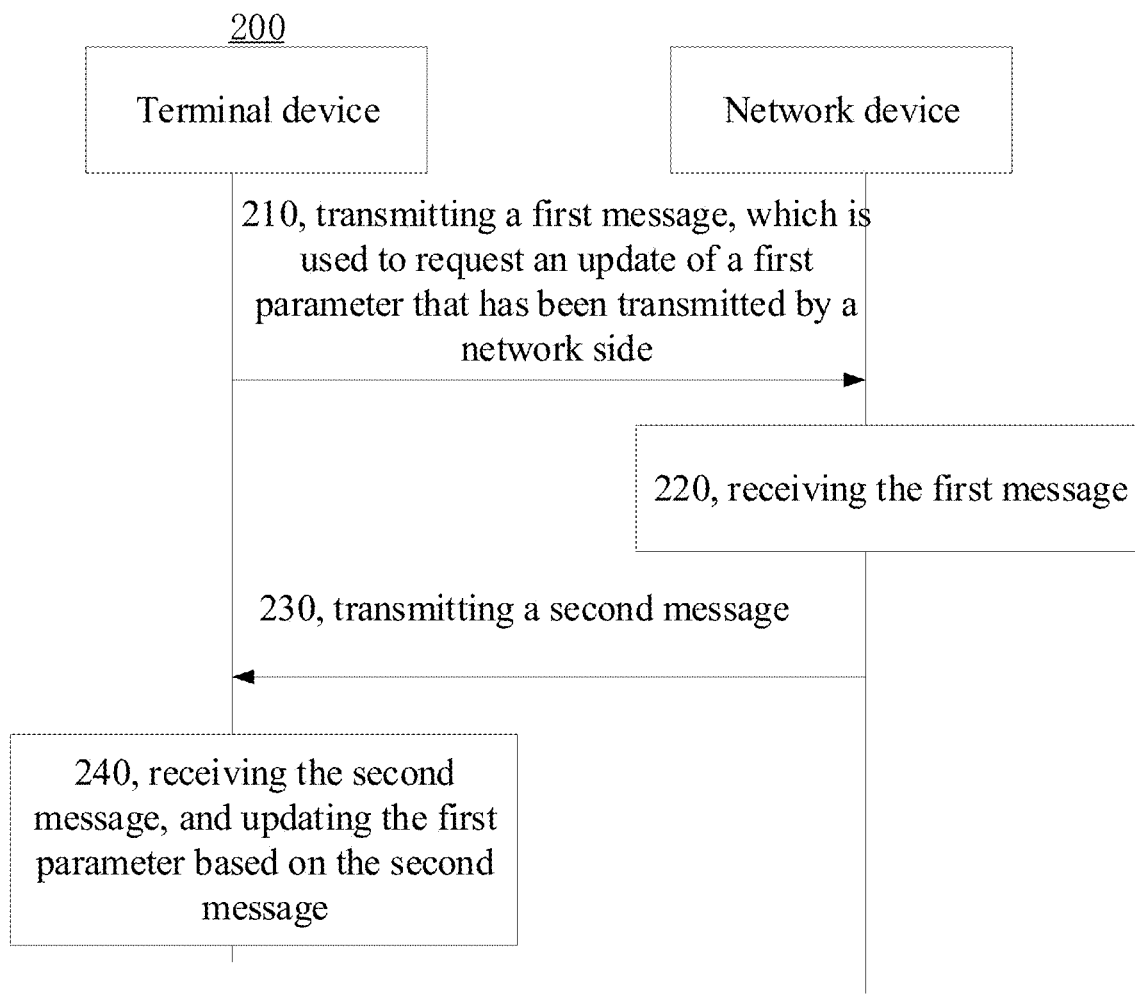
FIG. 2 is a flowchart illustrating a wireless communication method according to an embodiment of the present disclosure.

FIG. 2 is a schematic flowchart illustrating a wireless communication method 200 according to an embodiment of the present disclosure. The method 200 can include at least part of the following content.

At block 210, a terminal device transmits a first message to a network device. The first message is used to request an update of a first parameter that has been transmitted by a network side to the terminal device.

Specifically, in order to meet a communication requirement of the terminal device, the network device can transmit a parameter (i.e., a configuration parameter) to the terminal device. However, in some cases, the parameter transmitted by the network device may affect communication performance of the terminal device. For example, when the terminal device includes at least two USIM cards, a parameter configured by the network device for one of the at least two USIM cards may affect communication of another of the at least two USIM cards. Therefore, according to an embodiment of the present disclosure, the network device may transmit the first message to the terminal device to request an update of the parameter that the network device has transmitted to the terminal device.

The network device as a receiver of the first message may be a device in a Radio Access Network (RAN), e.g., a base station, or a device in a core network, e.g., an AMF or an MME.

The network device that has transmitted the first parameter to the terminal device may be a network device in the RAN, e.g., a base station, or a device in a core network, e.g., an AMF or an MME.

The network device that has transmitted the first parameter to the terminal device and the network device that is the receiver of the first message may be the same network device or different network devices.

The update of the first parameter that has been transmitted mentioned in the embodiment of the present disclosure may refer to: deleting at least part of the first parameter that has been transmitted, updating a value of at least part of the first parameter that has been transmitted, or adding content to the first parameter that has been transmitted.

The first parameter mentioned in the embodiment of the present disclosure may include at least one of a Discontinuous Reception (DRX) cycle, a Globally Unique Temporary UE Identity (GUTI), and a Radio Network Temporary Identity (RNTI). Of course, the first parameter may also be, for example, a cycle, a resource and the like for the terminal device to transmit a reference signal, which is not specifically limited in this embodiment of the present disclosure.

In an embodiment of the present disclosure, the first parameter that the network device has transmitted to the terminal device may be transmitted to the terminal device through Non-Access Stratum (NAS) signaling, and specifically, may be included in the context that the network side replies to the terminal device during a registration process.

Specifically, the first parameter that the network device has transmitted to the terminal device may be transmitted to the terminal device by the network device through a registration request reply message in the registration process.

In at least one embodiment of the present disclosure, the terminal device may request the network device a number of times to update the first parameter that has been transmitted. For example, the network device may be periodically requested to update the first parameter that has been transmitted, or the network device may be requested to update the first parameter that has been transmitted when it is determined that the current first parameter that has been transmitted does not meet the communication requirement.

In at least one embodiment of the present disclosure, the first message can be an NAS message or an Access Stratum (AS) message, or a Packet Control Function (PCF) stratum message.

In at least one embodiment of the present disclosure, the first message can be a registration request message.

The registration request message according to an embodiment of the present disclosure may include a registration type parameter. The registration type parameter can identify an object of transmitting a registration request by the terminal device.

The object of transmitting the registration request indicated by the registration type parameter may include an initial registration (specifically, the terminal device is in a Registration Management (RM) Deregistered (RM-DEREGISTERED) state), mobility registration updating (specifically, the terminal device can be in the RM-DEREGISTERED state, and since the terminal device or mobile device needs to update its capability or a protocol parameter, a registration process is initiated, or a set of network slices allowed for the terminal device or mobile device is requested to be changed), periodic registration updating (specifically, the terminal device can be in the RM-DEREGISTERED state, and initiates the registration process when a periodic registration updating timer expires), an emergency registration (i.e., the terminal device is in a restricted service state), and a request of updating the first parameter.

The registration type parameter according to an embodiment of the present disclosure may include a plurality of bits. Different values of the registration type parameter represent different objects.

For example, the registration type parameter can include four bits. When three of these bits (which can be the three low-order bits) take a value 001, it represents the initial registration. A value 010 represents the mobility registration updating. A value 011 represents the periodic registration updating. A value 100 represents the emergency registration. A value 110, 101, 000, or 110 can represent the update of the first parameter. A value 111 can be reserved.

In at least one embodiment of the present disclosure, the first message may further indicate a specific parameter represented by the first parameter that is requested to be updated. In this case, the value of the registration type parameter may indicate the update of first parameter and a type of the first parameter that needs to be updated. For example, 110 represents an update of the GUTI, the value 101 represents an update of the DRX, etc.; or the first message may not indicate the type of the first parameter that needs to be updated, e.g., 000 represents that the first parameter needs to be updated (for example, indicating an occurrence of a paging collision mentioned below).

In an embodiment of the present disclosure, it is mentioned above that a new value can be added to the registration type parameter, which means that the first parameter needs to be updated. In an embodiment of the present disclosure, a new parameter can also be added to the registration request message. The new parameter can be independent of the registration type parameter.

In an embodiment of the present disclosure, the registration request message may indicate that the first parameter needs to be updated, in addition to indicating an object of the registration request (the initial registration, the mobility registration updating, the periodic registration updating, or the emergency registration). Or, in an embodiment of the present disclosure, the initial registration, the mobility registration updating, the periodic registration updating, or the emergency registration may be a registration object in parallel with updating the first parameter. That is, only one object may be carried in one registration request message.

In at least one embodiment of the present disclosure, the first message may also be a service request message or a Radio Resource Control (RRC) message.

When the first parameter is the GUTI or the DRX cycle, the first message may be the NAS message, e.g., the registration request message or the service request message.

When the first parameter is the RNTI, the first message may be an AS message, e.g., an RRC message.

The service request message according to an embodiment of the present disclosure may include a service type parameter. The service type parameter can identify an object of the terminal device initiating a service request process.

The objects of transmitting a service request indicated by the service type parameter may include signaling, data, a mobile terminal service, an emergency service, an emergency service fallback, a high-priority access, a parameter update, and the like.

The service type parameter according to an embodiment of the present disclosure may include a plurality of bits. Different values of the service type parameter represent different objects.

For example, the service type parameter may include four bits. For example, 0000 represents signaling, 0001 represents data, 0010 represents the mobile terminal service, 0011 represents the emergency service, 0100 represents the emergency service fallback, 0101 represents the high priority-access, and 1111 represents the parameter update, and the like.

In at least one embodiment of the present disclosure, the first message may further indicate a specific parameter represented by the first parameter that is requested to be updated. Then, the value of the service type parameter may indicate the update of the first parameter and the type of the first parameter that needs to be updated. For example, 1111 represents the update of the GUTI, the value 1110 represents the update of the DRX, etc.; or the first message may not indicate the type of the first parameter that needs to be updated, e.g., 1111 represents that the first parameter needs to be updated (for example, indicating the occurrence of the paging collision mentioned below).

In an embodiment of the present disclosure, it is mentioned above that a new value can be added to the service type parameter, which means that the first parameter needs to be updated. In an embodiment of the present disclosure, a new parameter can also be added to the service request message. The new parameter can be independent of the service type parameter.

In an embodiment of the present disclosure, the service request message may indicate that the first parameter needs to be updated, in addition to indicating an object of the service request (signaling, data, the mobile terminal service, the emergency service, the emergency service fallback, and the high-priority access). Or, in an embodiment of the present disclosure, a signaling transmission, a data transmission, the mobile terminal service, the emergency service, the emergency service fallback, and the high-priority access may be a service request object in parallel with updating the first parameter. That is, only one object may be carried in one service request message.

At block 220, the network device receives the first message transmitted by the terminal device. The first message is used to request the update of the first parameter that has been transmitted by the network device to the terminal device.

At block 230, the network device transmits a second message to the terminal device. The second message is used to indicate the updated first parameter.

At block 240, the terminal device receives the second message transmitted by the network device, and updates the first parameter based on the second message.

Specifically, after receiving the first message transmitted by the terminal device, the network device may obtain the updated first parameter, and indicate the updated first parameter to the terminal device through the second message.

In at least one embodiment of the present disclosure, the first message may also carry assistance information. The assistance information may be used by the network device to determine the updated first parameter. For example, the assistance information may be the value or the value range of the updated first parameter expected by the terminal device, or indicates a parameter type or a parameter identifier for the update.

In an implementation, when the terminal device requests, through the first message, the update of the first parameter that the network device has transmitted to the terminal device, the value of the first parameter supported or recommended by the terminal device may be carried in the first message. Then, the network device may determine the first parameter expected by the terminal device as the updated first parameter. In this case, the network device may not transmit the second message to the terminal device, or may transmit a response message to the terminal device, to notify the terminal device of the updated first parameter, i.e., the first parameter expected by the terminal device. In at least one embodiment, the updated first parameter determined by the network device may also be different from the value of the first parameter expected by the terminal device. Therefore, the network device may transmit the second message to the terminal device to notify the terminal device of the updated first parameter.

In another implementation, when the terminal device requests through the first message the update of the first parameter that the network device has transmitted to the terminal device, the first message may carry the value range of the first parameter expected by the terminal device. Therefore, the network device may determine the updated first parameter based on the value range of the first parameter expected by the terminal device. In this case, the network device may notify the terminal device of the updated first parameter.

The network device can store the assistance information for later use when determining the first parameter. For example, the assistance information can be taken into consideration in a periodic position update (a registration request RegistrationType=PeriodicUpdate) or a mobility position update (a registration request RegistrationType=mobility registration updating) to determine the first parameter that needs to be transmitted.

In at least one embodiment of the present disclosure, the second message may be the NAS message or the AS message. Of course, the second message may also be the PCF stratum message.

In an implementation, when the first message is the NAS message, the second message is also the NAS message.

In another implementation, when the first message is the AS message, the second message is also the AS message.

Of course, the first message may be the NAS message, and the second message may be the AS message; or, the first message may be the AS message, and the second message may be the NAS message.

In at least one embodiment of the present disclosure, the second message may be the registration request reply message or a UE (User Equipment) Configuration Update (UCU) command message or a service reply message.

In an implementation, when the first message is the registration request message, the second message may be the registration request reply message or the UCU command message.

Figure 3:
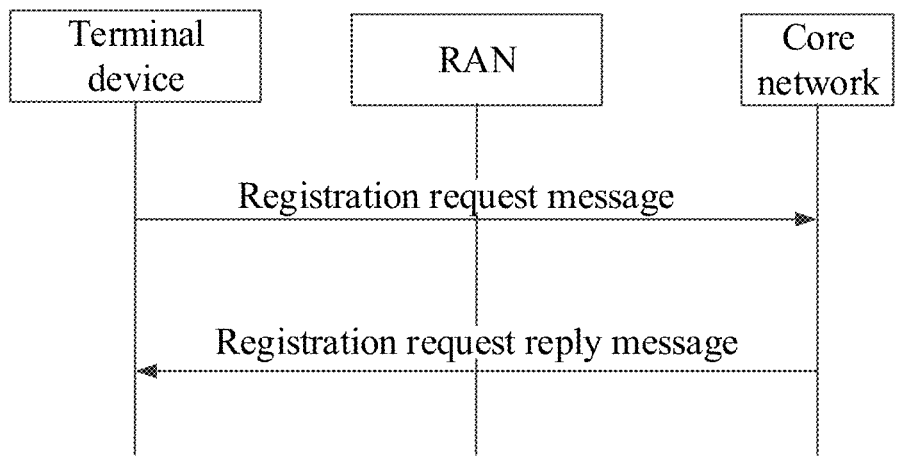
FIG. 3 is a flowchart illustrating a wireless communication method according to an embodiment of the present disclosure.

For example, as illustrated in FIG. 3, the terminal device may transmit the registration request message to the network device of the core network, and the network device of the core network may feed back the updated first parameter through the registration request reply message. It should be understood that the registration request message and the registration request reply message illustrated in FIG. 3 are only part of the messages in a registration process. In the registration process of the terminal device, there are other messages between the terminal device and the network side, or between devices at the network side. The registration process in an embodiment of the present disclosure may include an attach process and a position update process.

In an implementation, when the first message is the service request message, the second message may be a service request reply message or a UCU command.

Figure 4:
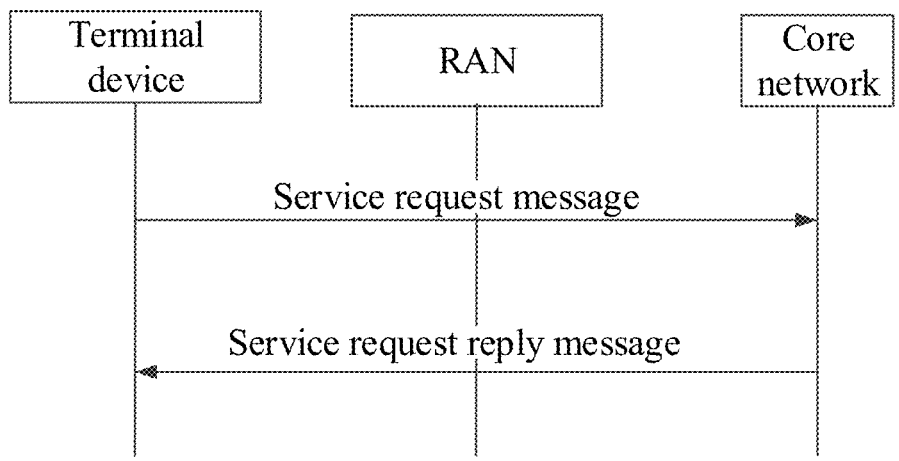
FIG. 4 is a flowchart illustrating a wireless communication method according to an embodiment of the present disclosure.

For example, as illustrated in FIG. 4, the terminal device may transmit the service request message to the network device of the core network, and the network device of the core network may feed back the updated first parameter through the service request reply message. It should be understood that the service request message and the service request reply message illustrated in FIG. 4 may be part of the messages in the service request process.

In an embodiment of the present disclosure, when the first message is the registration request message or the service request message, the second message may be the UCU command message. Then, the network device may still transmit the registration request reply message or the service request reply message to the terminal device, but the updated first parameter is no longer carried in the registration request reply message or the service request reply message.

Figure 5:
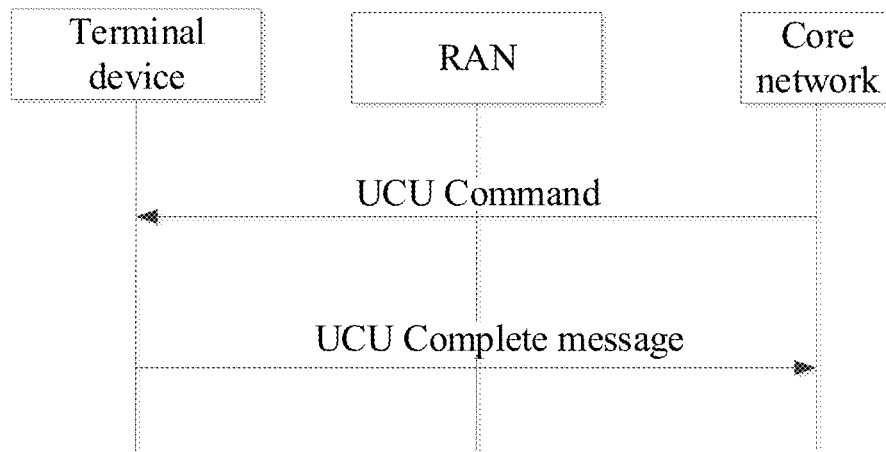
FIG. 5 is a flowchart illustrating a wireless communication method according to an embodiment of the present disclosure.

In an embodiment of the present disclosure, for example, as illustrated in FIG. 5, after the network device transmits the UCU command carrying the updated first parameter to the terminal device, the terminal device may reply to the network device a UE configuration Update Complete (UCU Complete) message.

The UCU command can be transmitted by the AMF or the PCF. When the UCU command is transmitted by the PCF, the AMF can transparently transmit the UCU command.

In an embodiment of the present disclosure, the service request message or the registration request message can be transmitted to the AMF. The AMF can transmit to the PCF the service request message or part of the information in the service request message (for example, information indicating requesting an update of a parameter), on the basis of which the PCF can transmit the UCU command to the terminal device.

Specifically, the service request message or the registration request message can carry a container. The container can carry information requesting the update of the parameter. The AMF can transmit the message carrying the container to the PCF, or transmit information in the container (for example, to be carried in other messages) to the PCF.

In at least one embodiment of the present disclosure, the first parameter may be an AS parameter (in the case of between the terminal device and the RAN) or an NAS parameter (in the case of between the terminal device and the AMF or the SMF), or a PCF parameter (for example, a UE policy parameter) (in the case of between the terminal device and the PCF).

The first parameter requested to be updated according to an embodiment of the present disclosure may include the GUTI and/or the DRX cycle and/or the RNTI, or may also be another first parameter, for example, an International Mobile Subscriber Identification (IMSI) number. The IMSI number may be used to calculate a Paging Frame (PF) and/or a Paging Occasion (PO).

In an embodiment of the present disclosure, the GUTI in the 5G system is a temporary identifier assigned to the terminal device by the core network, and is used by the terminal device in a subsequent registration request after the initial registration is completed, such that the AMF can uniquely determine information of the terminal device.

The GUTI is very rich in content. The network side can determine a specific Public Land Mobile Network (PLMN), the AMF of a service, and an identifier of the terminal device based on GUTI information of the terminal device. The GUTI may include 5G-S-TMSI.

5G-S-TMSI=AMF Set ID+AMF Pointer+5G-TMSI (i.e., 5G-M-TMSI). When 5G-S-TMSI is used to calculate the PF and/or the PO mentioned below, UE-ID is obtained by 5G-S-TMSI mod 1024, or the UE-ID can also be 5G-TMSI, i.e., 5G-M-TMSI. The TMSI represents a Temporary Mobile Subscriber Identity.

For a 4th-Generation (4G) system, the GUTI can include S-TMSI, and UE-ID can be obtained by S-TMSI mod 1024, or the GUTI can also include the IMSI number, and UE-ID can be obtained by IMSI mod 1024.

In at least one embodiment of the present disclosure, when the first message requests an update of a certain parameter, the second message may carry all the information of the certain parameter, or may also carry part of the information of the certain parameter (i.e., the update part). For example, for the GUTI, the updated 5G-S-TMSI or 5G-TMSI may be carried in the second message.

In an embodiment of the present disclosure, the terminal device can use the DRX in an RRC idle state (RRC_IDLE) or an RRC inactive state (RRC_INACTIVE) to reduce power consumption. That is, the terminal device can monitor paging messages one or more times in one DRX cycle. The terminal device can listen to the paging message at the PO of the PF. One PO may include a plurality of time units (for example, a slot or an Orthogonal Frequency Division Multiplexing (OFDM) symbol). The PF may include one or more POs or starting points of the POs.

In the LTE system, calculation formulas of the PF and the PO are as follows:

$$\text{SFN mod } T = (T \text{ div } N)^*(\text{UE\_ID mod } N) \quad \text{Formula 1}$$

$$i\_s = \text{floor}(\text{UE\_ID}/N) \text{ mod } Ns \quad \text{Formula 2}$$

Or, in the NR system, the calculation formulas of the PF and the PO are as follows:

$$(\text{SFN}+\text{PF\_offset}) \text{ mod } T = (T \text{ div } N)^*(\text{UE\_ID mod } N) \quad \text{Formula 3}$$

$$i\_s = \text{floor}(\text{UE\_ID}/N) \text{ mod } Ns \quad \text{Formula 4}$$

The above two groups of formulas illustrate how the PF and the PO are calculated in the LTE system and the NR system. Take Formula 3 and Formula 4 as example. In Formula 3 (SFN+PF_offset) mod T=(T div N)*(UE_ID mod N), PF_offset and N are obtained from cell broadcast information, T is the DRX cycle transmitted by the core network or a cycle pre-configured on a base station side (if there are two or three possible DRX values, the DRX cycle having the smallest value is selected), and UE_ID is 5G-S-TMSI (part of 5G-GUTI). Therefore, it can be seen that only a System Frame Number (SFN) in the equation is unknown, and a specific value of the SFN can be obtained. The SFN determines a value of the PF.

In Formula 4 i_s=floor(UE_ID/N) mod Ns, i_s can be calculated. This parameter is used to indicate an index value of the PO. When the UE calculates an i_s number for a USIM, monitoring time information (such as a subframe or the OFDM symbol) in a specific radio frame corresponding to the i_s number can be obtained from a system broadcast message, such that the terminal device only needs to monitor the paging message at specified time after entering the RRC_IDLE state and the RRC_INACTIVE state, without having to monitor the paging message at any other time.

Parameters in the above Formula 1-Formula 4 can be explained as follows.

1) T represents the DRX cycle. The parameter T has three values:

Cell-level DRX cycle, which is the DRX cycle pre-configured at the base station and transmitted to all terminal devices in the cell through a broadcast message;

Terminal device-level DRX cycle (UE-level DRX), which is used for the terminal device in the RRC_IDLE state to calculate the PF and the PO, can be transmitted to the base station by a core network device (MME/AMF), and then transmitted to the terminal device by the base station; and RAN-level DRX cycle, which is used for the terminal device in the RRC_INACTIVE state to calculate the PF and the PO, can be transmitted by the core network device to the base station, and then transmitted to the terminal device by the base station.

2) A parameter UE-ID

In 4G, UE-ID can be IMSI mod 1024, or can be obtained from IMSI mod 1024; and

In 5G, UE-ID can be 5G-S-TMSI mod 1024.

3) Other parameters, including "N", "Ns", and "PF_offset", are first parameters broadcast by the system, i.e., which can be obtained by the terminal device through cell broadcast. Values of the first parameter can be the same for different terminal devices.

A trigger for the terminal device to request the update of the parameter can be the paging collision between the at least two USIM cards of the terminal device. Of course, the parameter that is triggered to be updated due to the paging collision between the at least two USIM cards can also be another parameter, which is not specifically limited in this embodiment of the present disclosure.

In an embodiment of the present disclosure, in a case that the terminal device includes at least two USIM cards and the at least two USIM cards are both registered to the network, the terminal device needs to perform paging monitoring on the at least two USIM cards. Therefore, the paging collision between two USIM cards may occur. Specifically, the paging collision may be a PF collision, a paging time collision, or a paging processing time collision. If a number of receiving units used by the terminal device (for example, there is only one receiving unit) is smaller than a number of colliding USIM cards, it is impossible to implement the paging monitoring for all USIM cards that have a paging collision.

Figure 6:
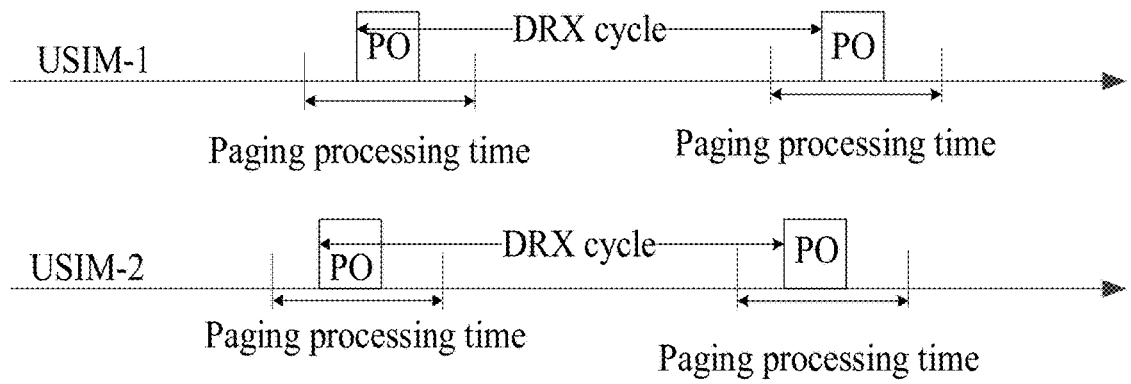
FIG. 6 is a schematic diagram showing a paging collision between two Universal Subscriber Identity Module (USIM) cards according to an embodiment of the present disclosure.

For example, as illustrated in FIG. 6, the PO and the paging processing time, which can be longer than the PO, of USIM card 1 collide with those of USIM card 2.

The paging processing time mentioned in an embodiment of the present disclosure may include a paging preparation time (time before the PO in FIG. 6), the PO, and a time for processing the received paging message (time after the PO in FIG. 6). Of course, the paging processing time may also not include the paging preparation time and/or the time for processing the received paging message.

If network interactions of two USIM cards are independent of each other, network elements corresponding to the two USIM cards cannot coordinate a problem of paging collision.

Therefore, in an embodiment of the present disclosure, in a case of a paging collision between at least two USIM cards of the terminal device, the terminal device transmits the first message using a first USIM card of the at least two USIM cards. The first parameter is used to calculate a time parameter (herein sometimes referred to as the time parameter corresponding to the first USIM card) for the terminal device to monitor or process the paging message for the first USIM card. Correspondingly, the network device receives the first message, which is transmitted by the terminal device through using first USIM card of the at least two USIM cards of the terminal device.

After receiving the first message transmitted by the terminal device, the network device may transmit the updated first parameter to the terminal device. Therefore, the terminal device recalculates the time parameter based on the updated first parameter transmitted by the network device.

In at least one embodiment of the present disclosure, the time parameter may include at least one of the PF, the PO, the paging processing time, and a paging processing duration.

Figure 7:
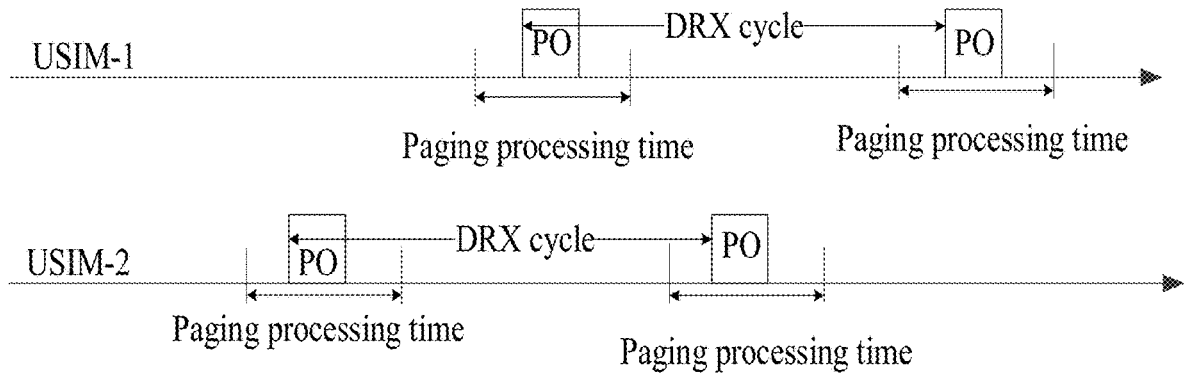
FIG. 7 is a schematic diagram showing no paging collision between two USIM cards according to an embodiment of the present disclosure.

For example, in a paging collision scenario illustrated in FIG. 6, the terminal device can transmit the first message using the USIM card 1, and the network device can transmit to the terminal device the updated first parameter that can be used to calculate the PF and/or the PO, thereby achieving an effect as illustrated in FIG. 7 that the POs and the paging processing times of the USIM card 1 and the USIM card 2 no longer collide with each other.

In a case where at least two USIM cards collide with each other, the first parameter used for updating may be the GUTI and/or the DRX cycle, or the IMSI, or other parameters for calculating the time parameter.

In at least one embodiment of the present disclosure, the first message may include assistance information. The assistance information indicates at least one of the following.

1) A second parameter. The second parameter is used to calculate a time parameter (herein sometimes referred to as the time parameter corresponding to a second USIM card) for the terminal device to monitor or process the paging message for the second USIM card of the at least two USIM cards.

Specifically, since the network device of the first USIM card cannot obtain a parameter for calculating the time parameter (e.g., at least one of the PF, the PO, the paging processing time, and the paging processing duration) corresponding to the second USIM card (e.g., because the network devices of the two USIM cards cannot interact with each other), in order to avoid the paging collision between the first USIM card and the second UMSI card, a value of the second parameter for calculating the time parameter corresponding to the second USIM card of the terminal device can be notified to the network device of the first USIM card, such that the network device of the first USIM card may refer to the value to determine a value of the first parameter used to calculate the time parameter corresponding to the first USIM card of the terminal device, thereby avoiding the paging collision between the two USIM cards.

2) The time parameter (e.g., at least one of the PF, the PO, the paging processing time, and the paging processing duration) for the terminal device to monitor or process the paging message for the second USIM card.

Specifically, since the network device of the first USIM card cannot obtain the parameter for calculating the time parameter corresponding to the second USIM card (e.g., because the network devices of the two USIM cards cannot interact with each other), in order to avoid the paging collision between the first USIM card and the second UMSI card, the time parameter corresponding to the second USIM card can be notified to the network device of the first USIM card, such that the network device of the first USIM card may refer to the value to determine the value of the first parameter, thereby avoiding the paging collision between the two USIM cards.

3) A value or a value range of the first parameter expected by the terminal device.

Specifically, the terminal device may determine, based on the time parameter corresponding to the second USIM card, the expected value or value range of the first parameter used to calculate the time parameter corresponding to the first USIM card, and notify the network device of the expected value or value range, thereby avoiding a case where the first USIM card and the second USIM card collide with each other again after the first parameter is updated.

The assistance information according to an embodiment of the present disclosure can be stored on the network device. In a subsequent registration request of the terminal device, especially in the periodic position update (Registration Request RegistrationType=PeriodicUpdate) or the mobility position update (Registration Request Registration Type=mobility registration updating), the assistance information is taken into consideration, thereby preventing the paging collision from happening again.

Alternatively, in an embodiment of the present disclosure, the updated first parameter may also be stored on a network device side, so that the updated first parameter can be considered in the subsequent periodic position update or mobility position update, thereby preventing the paging collision from happening again.

In at least one embodiment of the present disclosure, after recalculating the time parameter for the terminal device to monitor the paging message for the first USIM card based on the updated first parameter, the terminal device transmits, in response to the paging collision between the at least two USIM cards of the terminal device being still present, a third message using the second USIM card of the at least two USIM cards. The third message is used to request an update of the second parameter, and the second parameter is used to calculate a time parameter for the terminal device to monitor or process a paging message for the second USIM card of the at least two USIM cards.

Specifically, in a case where the pagings of the at least two USIM cards of the terminal device still collide with each other after recalculating the time parameter corresponding to the first USIM card, the terminal device can transmit the third message to the network device of the second USIM card using the second USIM card for requesting an update of the above second parameter. After the third message of the terminal device is received by the network device of the second USIM card, a fourth message may be transmitted to the terminal device. The fourth message is used to update the second parameter. Therefore, the terminal device can recalculate the above time parameter corresponding to the second USIM card based on the second parameter.

In an embodiment of the present disclosure, description of the first parameter may be applicable to the second parameter. For brevity, details thereof will be omitted here.

In this implementation, a number of signaling messages for interactions between the terminal device and the network device of one USIM card can be reduced, such that a network burden can be balanced.

It is described above that the terminal device can request the update of the first parameter used to calculate the above time parameter corresponding to the USIM card, but the embodiments of the present disclosure are not limited in this regard. An embodiment of the present disclosure can also be applicable to an update of any parameter in the context of the terminal device.

In an embodiment of the present disclosure, the terminal device can request the network device to update the parameter that the network device has transmitted to the terminal device, such that the parameter that the network device has transmitted can be updated to avoid a situation where the parameter that has been transmitted cannot meet a current communication requirement, thereby improving the communication performance.

Figure 8:
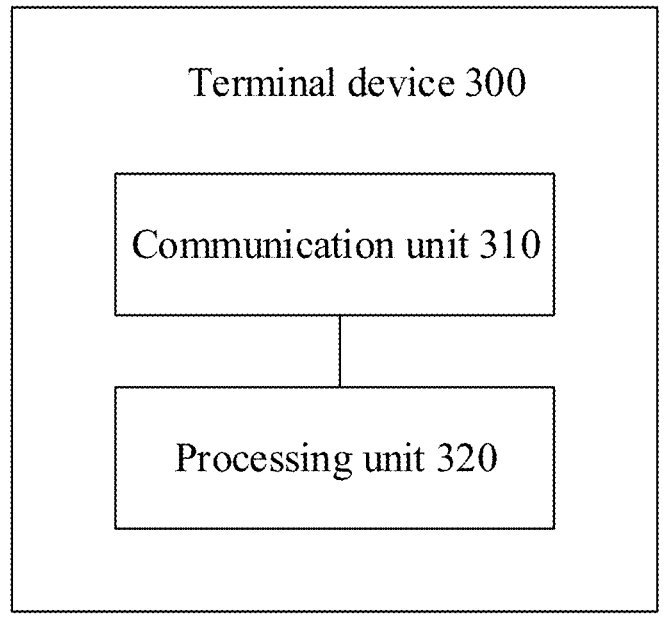
FIG. 8 is a schematic block diagram of a terminal device according to an embodiment of the present disclosure.

FIG. 8 is a schematic block diagram of a terminal device 300 according to an embodiment of the present disclosure.

As illustrated in FIG. 8, the terminal device 300 includes a communication unit 310 and a processing unit 320. The communication unit 310 is configured to transmit a first message to a network device. The first message is used to request an update of a first parameter that has been transmitted by a network side to the terminal device. The communication unit 310 is further configured to receive a second message, which is transmitted by the network device based on the first message. The processing unit 320 is configured to update the first parameter based on the second message.

In at least one embodiment of the present disclosure, the first message is an NAS message or an AS message.

In at least one embodiment of the present disclosure, the second message is an NAS message or an AS message.

In at least one embodiment of the present disclosure, the first message is a registration request message, and/or the second message is a registration request reply message or a UCU command message.

In at least one embodiment of the present disclosure, the registration request message includes a registration type parameter, and the registration type parameter is used to request the update of the first parameter.

In at least one embodiment of the present disclosure, the first message is a service request message, and/or the second message is a service request reply message or a UCU command message.

In at least one embodiment of the present disclosure, the first parameter includes an NAS parameter or an AS parameter.

In at least one embodiment of the present disclosure, the first parameter includes at least one of a DRX cycle, a GUTI, and an RNTI.

In at least one embodiment of the present disclosure, the first message further includes assistance information for the network device to obtain the updated first parameter.

In at least one embodiment of the present disclosure, the communication unit 310 is further configured to, in response to a paging collision between at least two USIM cards of the terminal device, transmit the first message using a first USIM card of the at least two USIM cards. The first parameter is used to calculate a time parameter for the terminal device to monitor or process a paging message for the first USIM card.

In at least one embodiment of the present disclosure, the time parameter includes a PF and/or a PO.

In at least one embodiment of the present disclosure, the first message further indicates at least one of: a second parameter, which is used to calculate a time parameter for the terminal device to monitor or process the paging message for a second USIM card of the at least two USIM cards; the time parameter for the terminal device to monitor or process the paging message for the second USIM card; and a value or a value range of the first parameter supported or recommended by the terminal device.

In at least one embodiment of the present disclosure, the processing unit 320 is further configured to recalculate the time parameter for the terminal device to monitor the paging message for the first USIM card based on the updated first parameter. The communication unit 310 is further configured to transmit, in response to the paging collision between the at least two USIM cards of the terminal device being still present, a third message using the second USIM card of the at least two USIM cards. The third message is used to request an update of the second parameter, and the second parameter is used to calculate a time parameter for the terminal device to monitor or process a paging message for the second USIM card of the at least two USIM cards.

It should be understood that the terminal device 300 may be used to implement corresponding operations implemented by the terminal device in the above method embodiments. For brevity, details thereof will be omitted here.

Figure 9:
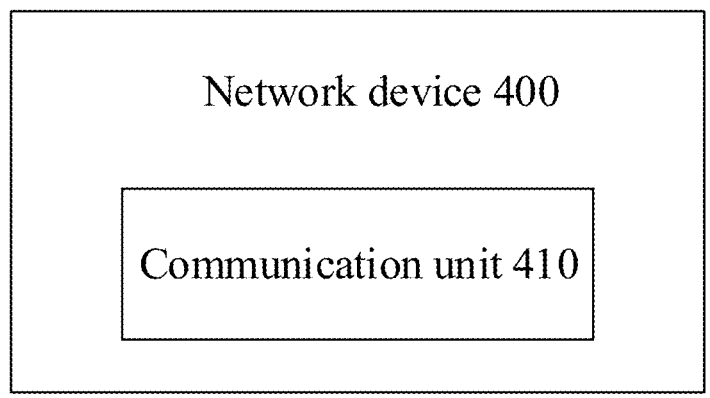
FIG. 9 is a schematic block diagram of a network device according to an embodiment of the present disclosure.

FIG. 9 is a schematic block diagram of a network device 400 according to an embodiment of the present disclosure.

As illustrated in FIG. 9, the network device 400 includes a communication unit 410 configured to receive a first message transmitted by a terminal device. The first message is used to request an update of a first parameter that has been transmitted by a network side to the terminal device. The communication unit 410 is further configured to transmit a second message to the terminal device based on the first message. The second message is used to instruct the update of the first parameter.

In at least one embodiment of the present disclosure, the first message is an NAS message or an AS message.

In at least one embodiment of the present disclosure, the second message is an NAS message or an AS message.

In at least one embodiment of the present disclosure, the first message is a registration request message, and/or the second message is a registration request reply message or a UCU command message.

In at least one embodiment of the present disclosure, the registration request message includes a registration type parameter, and the registration type parameter is used to request the update of the first parameter.

In at least one embodiment of the present disclosure, the first message is a service request message, and/or the second message is a service request reply message or a UCU command message.

In at least one embodiment of the present disclosure, the first parameter includes an NAS parameter or an AS parameter.

In at least one embodiment of the present disclosure, the first parameter includes at least one of a DRX cycle, a GUTI, and an RNTI.

In at least one embodiment of the present disclosure, the first message further includes assistance information for the network device to obtain the updated first parameter.

In at least one embodiment of the present disclosure, the communication unit 410 is further configured to receive the first message, which is transmitted by the terminal device using a first USIM card of at least two USIM cards. The first parameter is used to calculate a time parameter for the terminal device to monitor or process a paging message for the first USIM card.

In at least one embodiment of the present disclosure, the time parameter includes a PF and/or a PO.

In at least one embodiment of the present disclosure, the first message further indicates at least one of: a second parameter, which is used to calculate a time parameter for the terminal device to monitor or process the paging message for a second USIM card of the at least two USIM cards; the time parameter for the terminal device to monitor or process the paging message for the second USIM card; and a value or a value range of the first parameter supported or recommended by the terminal device.

It should be understood that the network device 400 may be used to implement corresponding operations implemented by the network device in the above method embodiments. For brevity, details thereof will be omitted here.

Figure 10:
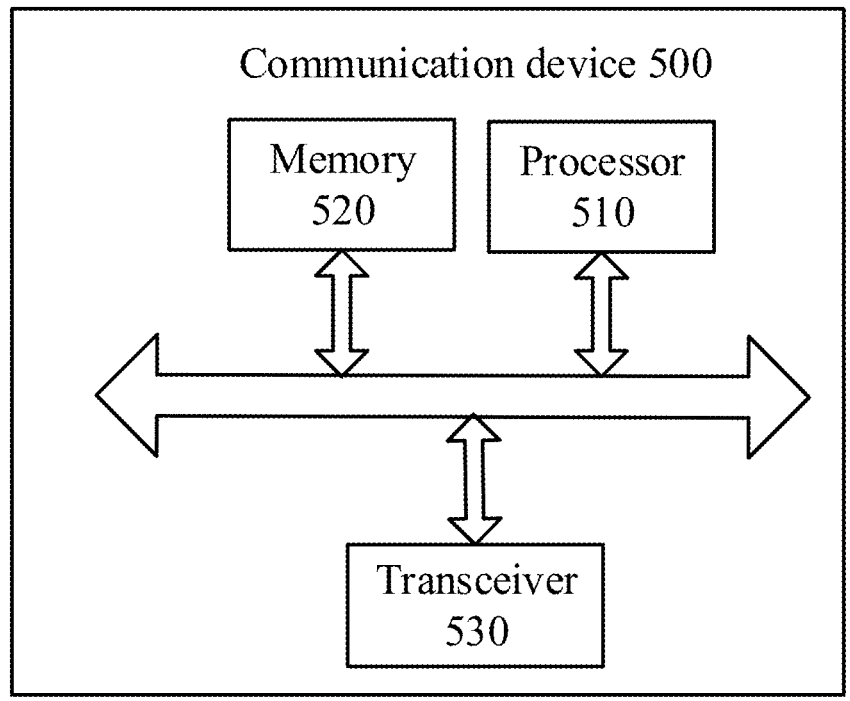
FIG. 10 is a schematic block diagram of a communication device according to an embodiment of the present disclosure.

FIG. 10 is a schematic diagram showing a structure of a communication device 500 according to an embodiment of the present disclosure. The communication device 500 illustrated in FIG. 10 includes a processor 510. The processor 510 is configured to invoke and run a computer program from a memory to perform the method according to an embodiment of the present disclosure.

In at least one embodiment, as illustrated in FIG. 10, the communication device 500 may further include a memory 520. The processor 510 may invoke and run a computer program from the memory 520 to perform the method according to an embodiment of the present disclosure.

Here, the memory 520 may be a separate component independent of the processor 510, or may be integrated in the processor 510.

In at least one embodiment, as illustrated in FIG. 10, the communication device 500 may further include a transceiver 530. The processor 510 may control the transceiver 530 to communicate with other devices. Specifically, information or data may be transmitted to or received from other devices.

Here, the transceiver 530 may include a transmitter and a receiver. The transceiver 530 may further include one or more antennas.

In at least one embodiment, the communication device 500 may specifically be a network device according to an embodiment of the present disclosure. The communication device 500 may execute corresponding processes implemented by the network device in methods according to embodiments of the present disclosure. For brevity, repeated description is omitted herein.

In at least one embodiment, the communication device 500 may specifically be the mobile terminal/terminal device according to an embodiment of the present disclosure. The communication device 500 may execute corresponding processes implemented by the mobile terminal/terminal device in methods according to embodiments of the present disclosure. For brevity, repeated description is omitted herein.

Figure 11:
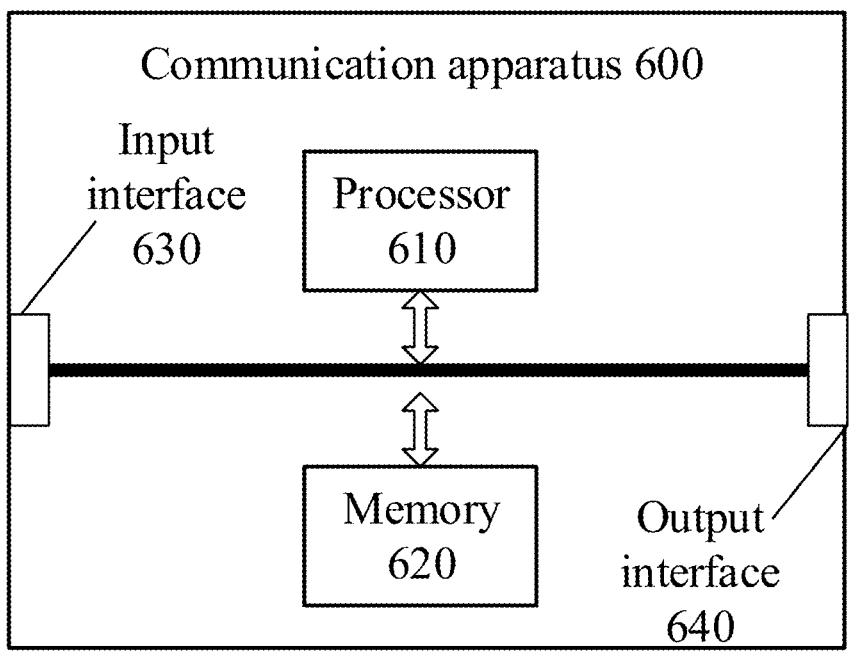
FIG. 11 is a schematic block diagram of a communication apparatus according to an embodiment of the present disclosure.

FIG. 11 is a schematic diagram showing a structure of a communication apparatus according to an embodiment of the present disclosure. A communication apparatus 600 illustrated in FIG. 11 includes a processor 610. The processor 610 can invoke and run a computer program from the memory to perform the method according to an embodiment of the present disclosure.

In at least one embodiment, as illustrated in FIG. 11, the communication apparatus 600 may further include a memory 620. The processor 610 may invoke and run a computer program from the memory 620 to perform the method according to an embodiment of the present disclosure.

Here, the memory 620 may be a separate component independent of the processor 610, or may be integrated in the processor 610.

In at least one embodiment, the communication apparatus 600 may further include an input interface 630. The processor 610 can control the input interface 630 to communicate with other devices or communication apparatuses. Specifically, information or data transmitted by other devices or communication apparatuses can be obtained.

In at least one embodiment, the communication apparatus 600 may further include an output interface 640. The processor 610 can control the output interface 640 to communicate with other devices or communication apparatuses. Specifically, information or data may be output to other devices or communication apparatuses.

In at least one embodiment, the communication apparatus can be applied to the network device according to an embodiment of the present disclosure. In addition, the communication apparatus can execute corresponding processes implemented by the network device in methods according to embodiments of the present disclosure. For brevity, repeated description is omitted herein.

In at least one embodiment, the communication apparatus can be applied to the mobile terminal/terminal device according to an embodiment of the present disclosure. The communication apparatus can execute corresponding processes implemented by the mobile terminal/terminal device in methods according to embodiments of the present disclosure. For brevity, repeated description is omitted herein.

It should be understood that the communication apparatus mentioned in the embodiments of the present disclosure may also be referred to as a system-level chip, a system-chip, a chip system, or a system-on-chip.

It is to be noted that the processor in the embodiment of the present disclosure may be an integrated circuit chip with signal processing capability. In an implementation, the operations of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component, to implement or perform the methods, operations, and logical block diagrams disclosed in the embodiments of the present disclosure. The general purpose processor may be a microprocessor or any conventional processor. The operations of the methods disclosed in the embodiments of the present disclosure may be directly embodied as being performed by a hardware decoding processor, or by a combination of hardware in the decoding processor and software modules. The software modules can be located in a commonly known storage medium in the related art, such as a random access memory, a flash memory, a read-only memory, a programmable read-only memory, an electrically erasable programmable memory, or a register. The storage medium can be located in the memory, and the processor can read information from the memory and perform the operations of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. By way of illustrating rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but is not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but is not limited to, these and any other suitable types of memories.

An embodiment of the present disclosure also provides a computer-readable storage medium for storing a computer program.

In at least one embodiment, the computer-readable storage medium can be applied to the network device in the embodiment of the present disclosure, and the computer program can cause a computer to perform corresponding procedures implemented by the network device in the methods according to the embodiments of the present disclosure. Details thereof will be omitted here for simplicity.

In at least one embodiment, the computer-readable storage medium can be applied to the mobile terminal/terminal device in the embodiment of the present disclosure, and the computer program can cause a computer to perform corresponding procedures implemented by the mobile terminal/terminal device in the methods according to the embodiments of the present disclosure. Details thereof will be omitted here for simplicity.

An embodiment of the present disclosure also provides a computer program product including computer program instructions.

In at least one embodiment, the computer program product can be applied to the network device in the embodiment of the present disclosure, and the computer program instructions can cause a computer to perform corresponding procedures implemented by the network device in the methods according to the embodiments of the present disclosure. Details thereof will be omitted here for simplicity.

In at least one embodiment, the computer program product can be applied to the mobile terminal/terminal device in the embodiment of the present disclosure, and the computer program instructions can cause a computer to perform corresponding procedures implemented by the mobile terminal/terminal device in the methods according to the embodiments of the present disclosure. Details thereof will be omitted here for simplicity.

An embodiment of the present disclosure also provides a computer program.

In at least one embodiment, the computer program can be applied to the network device in the embodiment of the present disclosure. The computer program, when executed on a computer, can cause the computer to perform corresponding procedures implemented by the network device in the methods according to the embodiments of the present disclosure. Details thereof will be omitted here for simplicity.

In at least one embodiment, the computer program can be applied to the mobile terminal/terminal device in the embodiment of the present disclosure. The computer program, when executed on a computer, can cause the computer to perform corresponding procedures implemented by the mobile terminal/terminal device in the methods according to the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraints of the technical solutions. Those skilled in the art may use different approaches for each specific application to implement the described functions, and such implementation is to be encompassed by the scope of this disclosure.

Those skilled in the art can clearly understand that, for the specific operation processes of the systems, devices, and units described above, reference can be made, for the convenience and conciseness of the description, to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, the essential part of the technical solutions according to the present disclosure (or the part thereof that contributes to the prior art) or all or part of the technical solutions according to the present disclosure can be embodied in the form of a software product. The computer software product may be stored in a storage medium and contain instructions to enable a computer device, such as a personal computer, a server, or a network device, etc., to perform all or part of the operations of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, or an optical disc.

While the specific embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of present disclosure as defined by the claims as attached.

What is claimed is:

1. A wireless communication method, applied in a terminal device, comprising:
   transmitting, by the terminal device, a first message to a network device so as to avoid paging collision between at least two Universal Subscriber Identity Module (USIM) cards in the terminal device, wherein the network device is a Mobility Management Entity (MME), wherein the first message is used to request an update of a first parameter;
   receiving, by the terminal device, a second message, which is transmitted by the network device based on the first message; and
   updating, by the terminal device, the first parameter based on the second message,
   wherein the method further comprises: calculating, by the terminal device using the first parameter, a time parameter for monitoring a paging message, wherein the paging message corresponds to a first USIM card of the at least two USIM cards in the terminal device, wherein the time parameter comprises a Paging Frame (PF) and/or a Paging Occasion (PO),
   wherein the method further comprises: monitoring, by the terminal device using the time parameter, the paging message,
   wherein the first message comprises assistance information for the network device to obtain the updated first parameter,
   wherein the assistance information comprises a value of the first parameter supported or recommended or requested by the terminal device,
   wherein the second message comprises a value of the first parameter determined by the network device, and the value of the first parameter determined by the network device is different from the value of the first parameter supported or recommended or_requested by the terminal device,
   wherein the first message is a Non-Access Stratum (NAS) message, and the second message is an NAS message,
   wherein said transmitting, by the terminal device, the first message to the network device comprises:
   transmitting, by the terminal device in response to the paging collision between at least two USIM cards of the terminal device, the first message using the first USIM card of the at least two USIM cards,
   wherein the method further comprises:
   determining, by the terminal device, that the paging collision between the at least two USIM cards of the terminal device is still present after recalculating the time parameter for the terminal device to monitor the paging message for the first USIM card based on the updated first parameter,
   transmitting, by the terminal device in response to the paging collision between the at least two USIM cards of the terminal device being still present after recalculating the time parameter for the terminal device to monitor the paging message for the first USIM card based on the updated first parameter, a third message to the network device using the second USIM card of the at least two USIM cards,
   receiving, by the terminal device, a fourth message, which is transmitted by the network device for updating a second parameter,
   updating, by the terminal device, the second parameter based on the fourth message, and
   calculating, by the terminal device using the second parameter, a time parameter for monitoring a paging message which corresponds to a second USIM card of the at least two USIM cards in the terminal device,
   wherein the third message is used to request an update of the second parameter, and the second parameter is used to calculate a time parameter for the terminal device to monitor or process a paging message for the second USIM card of the at least two USIM cards.

2. The method according to claim 1, wherein the first message is an attach request message or a position update request message, and the second message is an attach request reply message or a position update request reply message.

3. The method according to claim 1, wherein the time parameter for the terminal device to monitor the paging message for the first USIM card corresponding to the updated first parameter is different from the time parameter for the terminal device to monitor a paging message for a second USIM card of the at least two USIM cards.

4. A terminal device, comprising:
   a processor; and
   a memory,
   wherein the memory is configured to store a computer program, and the processor is configured to invoke and run the computer program stored in the memory to perform operations comprising:
   transmitting a first message to a network device so as to avoid paging collision between at least two Universal Subscriber Identity Module (USIM) cards in the terminal device, wherein the network device is a Mobility Management Entity (MME), wherein the first message is used to request an update of a first parameter;
   receiving a second message, which is transmitted by the network device based on the first message; and updating the first parameter based on the second message,
wherein the operations further comprise: calculating, by using the first parameter, a time parameter for monitoring a paging message, wherein the paging message corresponds to a first USIM card of the at least two USIM cards in the terminal device, wherein the time parameter comprises a Paging Frame (PF) and/or a Paging Occasion (PO),
wherein the operations further comprise: monitoring, by using the time parameter, the paging message,
wherein the first message comprises assistance information for the network device to obtain the updated first parameter,
wherein the assistance information comprises a value of the first parameter supported or recommended or requested by the terminal device,
wherein the second message comprises a value of the first parameter determined by the network device, and the value of the first parameter determined by the network device is different from the value of the first parameter supported or recommended or requested by the terminal device,
wherein the first message is a Non-Access Stratum (NAS) message, and the second message is an NAS message,
wherein the processor is further configured to invoke and run the computer program stored in the memory to perform operations comprising:
transmitting, in response to a paging collision between at least two USIM cards of the terminal device, the first message using the first USIM card of the at least two USIM cards,
wherein the processor is further configured to invoke and run the computer program stored in the memory to perform operations comprising:
determining that the paging collision between the at least two USIM cards of the terminal device is still present after recalculating the time parameter for the terminal device to monitor the paging message for the first USIM card based on the updated first parameter,
transmitting, in response to the paging collision between the at least two USIM cards of the terminal device being still present after recalculating the time parameter for the terminal device to monitor the paging message for the first USIM card based on the updated first parameter, a third message to the network device using the second USIM card of the at least two USIM cards,
receiving a fourth message, which is transmitted by the network device for updating the second parameter,
updating the second parameter based on the fourth message, and
calculating, by using the second parameter, a time parameter for monitoring a paging message which corresponds to a second USIM card of the at least two USIM cards in the terminal device,
wherein the third message is used to request an update of the second parameter, and the second parameter is used to calculate a time parameter for the terminal device to monitor or process a paging message for the second USIM card of the at least two USIM cards.

5. The terminal device according to claim 4, wherein the first message is an attach request message or a position update request message, and the second message is an attach request reply message or a position update request reply message.

6. The terminal device according to claim 4, wherein the time parameter for the terminal device to monitor the paging message for the first USIM card corresponding to the updated first parameter is different from the time parameter for the terminal device to monitor a paging message for a second USIM card of the at least two USIM cards.

7. A non-transitory computer-readable storage medium configured with instructions executable by one or more processors to cause the one or more processors to perform operations comprising:
transmitting a first message to a network device so as to avoid paging collision between at least two Universal Subscriber Identity Module (USIM) cards in a terminal device, wherein the network device is a Mobility Management Entity (MME), wherein the first message is used to request an update of a first parameter;
receiving a second message, which is transmitted by the network device based on the first message; and
updating the first parameter based on the second message,
wherein the operations further comprise: calculating, by using the first parameter, a time parameter for monitoring a paging message, wherein the paging message corresponds to a first USIM card of the at least two USIM cards in the terminal device, wherein the time parameter comprises a Paging Frame (PF) and/or a Paging Occasion (PO),
wherein the operations further comprise: monitoring, by using the time parameter, the paging message,
wherein the first message comprises assistance information for the network device to obtain the updated first parameter,
wherein the assistance information comprises a value of the first parameter supported or recommended or requested by the terminal device,
wherein the second message comprises a value of the first parameter determined by the network device, and the value of the first parameter determined by the network device is different from the value of the first parameter supported or recommended or requested by the terminal device,
wherein the first message is a Non-Access Stratum (NAS) message, and the second message is an NAS message,
wherein said transmitting the first message to the network device comprises:
transmitting, in response to the paging collision between at least two USIM cards of the terminal device, the first message using the first USIM card of the at least two USIM cards,
wherein the operations further comprise:
determining that the paging collision between the at least two USIM cards of the terminal device is still present after recalculating the time parameter for the terminal device to monitor the paging message for the first USIM card based on the updated first parameter,
transmitting, in response to the paging collision between the at least two USIM cards of the terminal device being still present after recalculating the time parameter for the terminal device to monitor the paging message for the first USIM card based on the updated first parameter, a third message to the network device using the second USIM card of the at least two USIM cards,
receiving a fourth message, which is transmitted by the network device for updating a second parameter,
updating the second parameter based on the fourth message, and
calculating, by using the second parameter, a time parameter for monitoring a paging message which corresponds to a second USIM card of the at least two USIM cards in the terminal device, wherein the third message is used to request an update of the second parameter, and the second parameter is used to calculate a time parameter for the terminal device to monitor or process a paging message for the second USIM card of the at least two USIM cards.

\* \* \* \* \*